S. E. BOLLES.
Whiffletree.
No. { 2,807, 33,811. }
Patented Nov. 26, 1861.
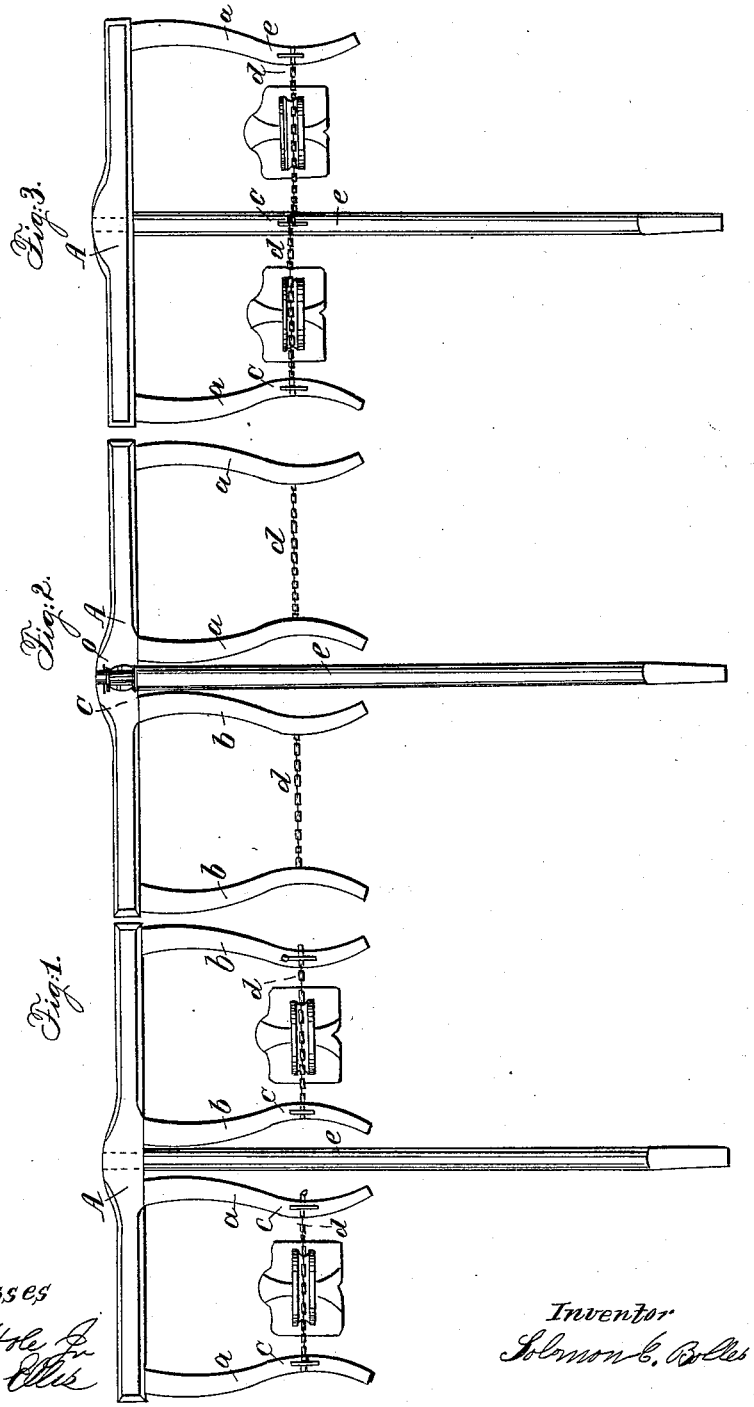
Witnesses
F. P. Hale
Thomas Ellis
Inventor
Solomon E. Bolles

UNITED STATES PATENT OFFICE.

SOLOMON E. BOLLES, OF MATTAPOISETT, ASSIGNOR TO HIMSELF AND THOS. ELLIS, OF ROCHESTER, MASSACHUSETTS.

IMPROVEMENT IN CARRIAGE-POLE SUPPORTERS.

Specification forming part of Letters Patent No. 33,811, dated November 26, 1861.

*To all whom it may concern:*

Be it known that I, SOLOMON E. BOLLES, of Mattapoisett, in the county of Plymouth and State of Massachusetts, have invented a new and useful or Improved Carriage-Pole Supporter; and I do hereby declare the same to be fully described in the following specification and illustrated in the accompanying drawings, of which—

Figure 1 denotes a top view of the said invention as applied to a carriage-pole. Fig. 2 is an underside view of the same.

The purpose of my invention is to support the carriage-pole upon the backs instead of upon the necks of horses. When the said pole is sustained by means of collars placed on the necks of the draft-animals, the peculiar vibrating motions of the pole, produced by the unevenness of the ground over which the carriage may pass, will often cause the collars to wear or chafe the necks of the horses so as to seriously injure them.

It is well known that heavy carriages (or those for transporting heavy loads) when their poles are attached to the collars of the horses cause such horses to wabble or stagger in traveling, and often when the forward wheels strike against an unyielding impediment one or both of the horses are either thrown upon their knees or are injuriously strained. To remedy these evils has been the object of my invention.

In carrying out my said invention I employ what may be termed a "breast-bar" A, the same having two pairs of short thills $a\ a\ b\ b$ jointed to it and extending rearward from it, as shown in the drawings. Each pair of the said thills is arranged at a suitable distance apart to receive a horse and to allow a small space to intervene between his sides and the thills in order to allow for the vibration of the pole without causing the said thills to come in contact with his sides. Furthermore, there are two long staples $c\ c$ disposed on the top surface of each pair of shafts to which the chain $d$ is to be attached, the said chain being so attached to the saddle as to be capable of being moved transversely of the latter under any material vibration of the pole.

C denotes the device for receiving the carriage-pole $c$, the same consisting of a flat bar of metal having its ends bent at right angles or thereabout, as seen in Fig. 2, and each having a hole formed through it for the reception of such pole. A pin $o$ passed through the said pole near its outer end serves to confine the pole to the breast-bar A, the connection of the said bar and pole being such as to allow the said bar or carriage-pole supporter to easily turn on the pole in a vertical direction. This mode of carrying out my invention is adapted more especially to wagons or carts used for transporting stones, timber, &c., from one place to another. Another mode of constructing the said carriage-pole supporter for lighter wagons or vehicles would be to dispense with each of the inner thills and attach the inner end of each saddle chain or band directly to the pole, as shown in Fig. 3, which represents the inner shafts as removed, and one end of each of the saddle-chains or back-band as applied to the pole, while the other two ends are applied to the outside thills, as before mentioned.

In case my improvement should be applied to a cart it will be evident a belly-band would have to be passed under each horse and attached to the thills in order to prevent the cart from tipping when loaded too heavily on the rear part.

An improved carriage-pole supporter constructed as above described possesses important advantages: First, the lateral sway of the pole caused by one of the wheels striking against an obstruction or impediment is borne equally by each of the horses; second, the weight of the pole is not borne by the necks of the horses, but by their backs, and as the saddle-chains can slide over the saddle under any great lateral movement of the pole, the friction of the chain upon the saddle serves to lessen the sudden concussion or vibration of the pole.

I claim—

My improved carriage-pole supporter, having its several parts constructed and arranged in relation to each other, and so as to operate together, substantially as shown and described.

SOLOMON E. BOLLES.

Witnesses:
F. P. HALE, Jr.,
THOMAS ELLIS.